United States Patent [19]
Morita

[11] Patent Number: 5,209,019
[45] Date of Patent: May 11, 1993

[54] SEAL STRUCTURE FOR AUTOMOBILE DOORS

[75] Inventor: Hiroyuki Morita, Oobu, Japan

[73] Assignee: Tokai Kogyo Kabushiki Kaisha, Oobu, Japan

[21] Appl. No.: 947,984

[22] Filed: Sep. 21, 1992

Related U.S. Application Data

[63] Continuation of Ser. No. 755,078, Sep. 5, 1991, abandoned.

[30] Foreign Application Priority Data

Sep. 27, 1990 [JP] Japan .................. 2-101529[U]

[51] Int. Cl.⁵ .............................................. E06B 7/16
[52] U.S. Cl. .................................. 49/490.1; 49/475.1; 49/495.1
[58] Field of Search ................ 49/485, 488, 489, 490, 49/491, 495, 440, 441

[56] References Cited

U.S. PATENT DOCUMENTS

| | | | |
|---|---|---|---|
| 4,455,785 | 6/1984 | Wahr et al. | 49/488 |
| 4,756,944 | 7/1988 | Kisanuki | 49/490 X |
| 4,843,759 | 7/1989 | Kisanuki et al. | 49/490 X |
| 4,919,471 | 4/1990 | Seino et al. | 49/488 X |
| 4,951,418 | 8/1990 | Keys | 49/490 X |
| 4,977,706 | 12/1990 | Kisanuki | 49/479 |
| 5,010,689 | 4/1991 | Vaughan | 49/490 X |
| 5,014,464 | 5/1991 | Dupuy et al. | 49/440 |
| 5,016,394 | 5/1991 | Iida et al. | 49/489 X |
| 5,054,241 | 10/1991 | Mishima et al. | 49/490 X |
| 5,150,542 | 9/1992 | Hannya et al. | 49/441 |

FOREIGN PATENT DOCUMENTS

| | | | |
|---|---|---|---|
| 171326 | 7/1990 | Japan | 49/485 |
| 227322 | 9/1990 | Japan | 49/485 |

Primary Examiner—Peter M. Cuomo
Assistant Examiner—Jerry Redman
Attorney, Agent, or Firm—Oblon, Spivak, McClelland, Maier & Neustadt

[57] ABSTRACT

A seal structure for automobile doors comprises a door flange clamping portion for mounting the seal structure on a door frame, a glass seal portion for stopping the gap between the door frame and a window glass and a drip seal. These elements are molded by integral extrusion. A support strip is integrally buried in the door flange clamping portion and the back surface of the glass seal portion. The glass seal portion has a sliding seal portion which comes into sliding contact with the inner wall surface of the window glass and a glass sealing lip which is situated outside of the window glass. The sliding seal portion is formed into a hollow shape so as to have elasticity and it has a hoodmolding portion at the end thereof. The hoodmolding portion is situated inside of the end portion of the glass sealing lip.

4 Claims, 3 Drawing Sheets

SEAL STRUCTURE FOR AUTOMOBILE DOORS

This application is a continuation of application Ser. No. 07/755,078, filed on Sep. 5, 1991, now abandoned.

BACKGROUND OF THE INVENTION

1. Field of the Invention

The present invention relates to a seal structure attached to an automobile door so as to prevent the ingress of raindrops, wind, dust and the like from the outside.

2. Description of the Prior Art

An automobile door or the like is generally provided with a seal structure which is composed of rubber, a plastic material or the like so as to prevent the ingress of raindrops and the like from the outside.

As shown in FIG. 2, in an automobile, doors 9 are mounted on the peripheral edges of the openings of the vehicle body on both sides thereof in such a manner as to be opened and closed and window glasses 92 are vertically movably inserted into the door frames 91 of the respective doors 9.

It is therefore necessary to provide a seal structure between the peripheral edge of the opening of the vehicle body and the door frame 91 and between the door frame 91 and the window glass 92, extending over the whole area L represented by the symbol L.

As shown in FIG. 3, a conventional seal structure 93 includes a door flange clamping portion 931 for mounting the seal structure 93 on the flange portion 911 of the door frame 91, a glass seal portion 932 for stopping a gap between the door frame 91 and the window glass 92, and a drip seal 933 for stopping the gap between the door frame 91 and the opening edge of the vehicle body.

The door flange clamping portion 931 and the drip seal 933 are integrally produced. A U-shaped support strip 94 is buried in the door flange clamping portion 931.

The glass seal portion 932, which is formed separately from the door flange clamping portion 931 and the drip seal 933, is mounted on the door frame 91 by a fitting metal 912. The glass seal portion 932 has a sliding lip portion 9321 which comes into sliding contact with the inner wall surface of the window glass 92, and a glass sealing lip 9322 which is situated on the outside of the window glass 92.

In FIG. 3, when the window glass 92 is raised, as indicated by the broken line in FIG. 3, the sliding lip portion 9321 and the glass sealing lip 9322 are bent and deformed in such a manner as to stop the gap between the window glass 92 and the door frame 91.

In FIG. 3, the reference numeral 9323 represents a glass contacting portion and 9324 a hollow portion provided in the glass contacting portion 9323.

Such a conventional seal structure for automobiles, however, cannot fully display the sealing function. This is because the sliding lip portion 9321 has a solid structure, as shown in FIG. 3, which makes the full play of elasticity impossible.

In addition, the end portion of the sliding lip portion 9321 is not accommodated in the glass sealing lip 9322, which damages the aesthetic appearance of the seal structure.

SUMMARY OF THE INVENTION

Accordingly, it is an object of the present invention to eliminate the above-described problems in the prior art and to provide a seal structure for automobile doors which has an excellent sealing function, a water shedding function and an excellent external appearance.

To achieve this aim, the present invention provides seal structure for automobile doors comprising: a door flange clamping portion for mounting the seal structure on a door frame; a glass seal portion for stopping the gap between the door frame and a window glass; and a drip seal. These elements are integrally produced by integral extrusion. The glass seal portion has a sliding seal portion which comes into sliding contact with the inner wall surface of the window glass and a glass sealing lip which is situated outside of the window glass. The sliding seal portion is formed into a hollow shape so as to have elasticity and it has a hoodmolding portion at the end thereof. The hoodmolding portion is situated inside of the end portion of the glass sealing lip. A support strip is integrally buried in the door flange clamping portion and the back surface of the glass seal portion. The above and other objects, features and advantages of the present invention will become clear from the following description of the preferred embodiment thereof, taken in conjunction with the accompanying drawings.

DETAILED DESCRIPTION

Figure 1:
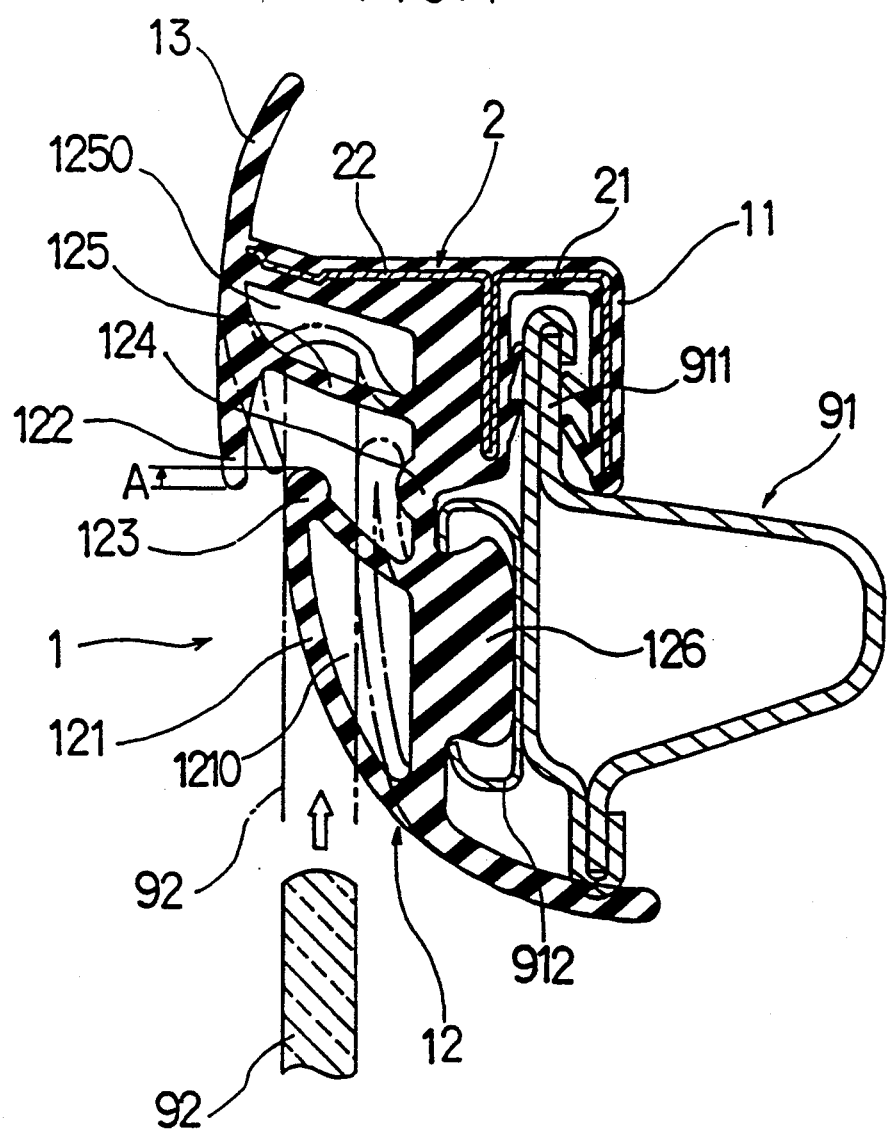
FIG. 1 is a sectional view of an embodiment of a seal structure for automobile doors according to the present invention, taken along the line B—B in FIG. 2.
Figure 2:
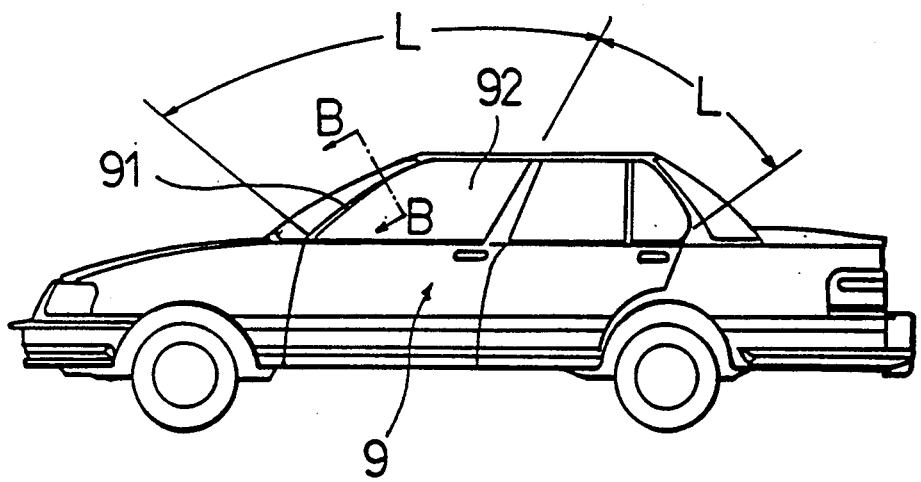
FIG. 2 is a side. elevational view of a vehicle body.
Figure 3:
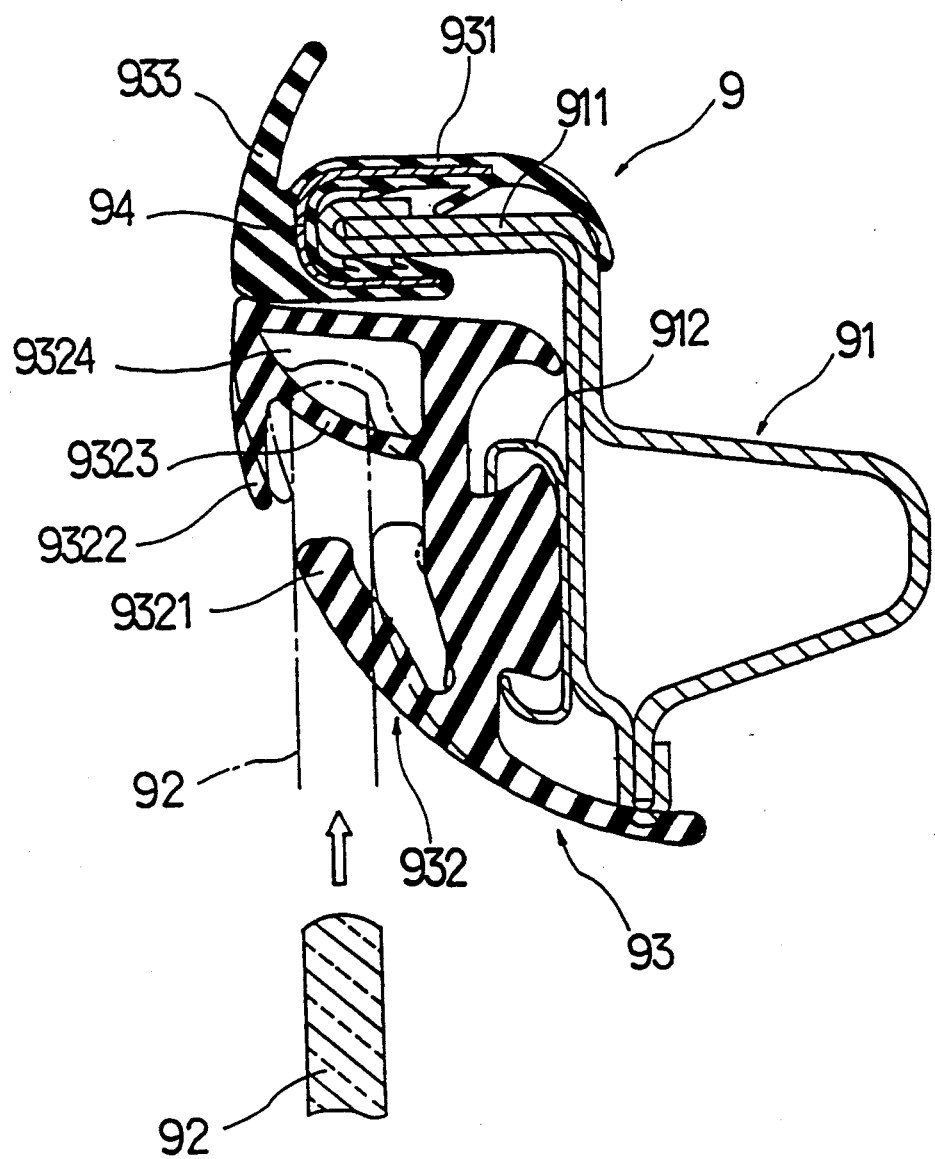
FIG. 3 is a sectional view of a conventional seal, taken along the line B—B in FIG. 2.

The most characteristic feature of the present invention is that the sliding seal portion which comes into sliding contact with the inner wall surface of the window glass is formed into a hollow shape having elasticity in order to improve the sealing function and that the hoodmolding portion is provided at the end of the sliding seal portion and inside of the end portion of the glass sealing lip in order to impart a water shedding function and to improve the external appearance.

In the present invention, the glass seal portion is preferably provided with a projection facing the hoodmolding portion. It is possible to enhance the water shedding function of the hoodmolding portion by firmly pressing the hoodmolding portion against the inner wall surface of the window glass by the projection.

In the present invention, the seal structure composed of the door flange clamping portion, the glass seal portion and the drip seal is produced by integral extrusion. Thus, the structure is simplified and the possibility of producing a gap between the elements at the time of assembly is precluded.

In the present invention, the support strip is integrally buried in the door flange clamping portion and the back surface of the glass seal portion. By virtue of this structure, a slight elasticity is imparted to the back surface of the glass seal portion in comparison with the prior art and the structure of the door frame on which the seal structure is mounted is simplified.

In the present invention, when the window glass is raised, the sliding seal portion is bent and deformed. Since the sliding seal portion is hollow, it has an excellent elasticity. The sliding seal portion therefore comes into sliding and close contact with the inner wall surface of the window glass.

When the window glass is lowered, the hoodmolding portion provided at the end of the sliding seal portion sheds waterdrops which have attached to the inner wall surface of the end portion of the window glass. Since the hoodmolding portion is situated inside of the end portion of the glass sealing lip, it is not seen from the outside.

The seal structure according to the present invention is produced by integral extrusion with the support strip inserted thereinto. Since the whole seal structure is integral in comparison with a conventional seal, manufacture and handling the seal structure of the present invention are facilitated.

The present invention thus provides a seal structure for automobile doors which has an excellent sealing function, a water shedding function and an excellent external appearance.

DESCRIPTION OF THE PREFERRED EMBODIMENT

An embodiment of a seal structure for automobile doors according to the present invention will be explained with reference to FIG. 1.

A seal structure 1 of this embodiment is composed of a door flange clamping portion 11 for mounting the seal structure 1 on a door frame 91, a glass seal portion 12 for stopping the gap between the door frame 91 and a window glass 92, and a drip seal 13. These elements 11, 12 and 13 are formed of an elastic material such as rubber and a plastic material by integral extrusion. The glass seal portion 12 has a sliding seal portion 121 which comes into sliding contact with the inner wall surface of the window glass 92 and a glass sealing lip 122 which is situated outside of the window glass 92.

The sliding seal portion 121 is formed into a hollow shape which has elasticity. An enlarged, bulbous hoodmolding portion 123 is provided at the free end of the sliding seal portion 121. The hoodmolding portion 123 is situated inside of the end portion of the glass sealing lip 122. A support strip 2 is integrally buried in the door flange clamping portion 11 and the back surface of the glass seal portion 12.

The door flange clamping portion 11 has a U-shaped cross section and a U-shaped clamping portion 21 of the support strip 2 is buried in the door flange clamping portion 11, as will be described later. When the seal structure 1 is mounted on an automobile door, the door flange clamping portion 11 is inserted into a flange portion 911 of the door frame 91.

The glass seal portion 12 has the sliding seal portion 121 The sliding seal portion 121 is bendable and deformable in the direction in which the window glass 92 is raised and a hollow portion 1210 is provided within the sliding seal portion 121.

The hoodmolding portion 123 is provided at the end of the sliding seal portion 121. The hoodmolding portion 123 has a solid structure. The glass seal portion 12 is provided with a projection 124 facing the hoodmolding portion 123 so as to press the hoodmolding portion 123 against the inner wall surface of the window glass 92 thereby.

The hoodmolding portion 123 is situated inside of the end portion of the glass sealing lip 122, namely, close to the base portion of the glass sealing lip 122.

The support strip 2 is composed of the clamping portion 21 which has a U-shaped cross section in conformity with the shape of the door flange clamping portion 11, and a back surface supporting portion 22 for supporting the back surface of the glass seal portion 12. The clamping portion 21 and the back surface supporting portion 22 are integrally formed. The clamping portion 21 and the back surface supporting portion 22 are integrally buried in the door flange clamping portion 11 and the back surface of the glass seal portion 12, respectively, by extrusion molding.

The glass seal portion 12 is provided with a glass contacting portion 125 which is brought into contact with the end portion of the window glass 92. The glass contacting portion 125 is provided with a hollow portion 1250. The door frame holding portion 126 of the glass seal portion 12 is fixed to a fitting metal 912 of the door frame 91. The other elements are the same as those in the prior art.

The seal structure of the present invention having the above structure has the following advantages.

When the window glass 92 is raised as indicated by the broken line in FIG. 1, the sliding seal portion 121 is bent and deformed. The hollow portion 1210 of the sliding seal portion 121 is also pushed and deformed. The volume of the sliding seal portion 121 is therefore greatly changed, and the sliding seal portion 121 has elasticity to that degree.

Accordingly, the sliding seal portion 121 comes into sliding and close contact with the inner wall surface of the window glass 92. So the sliding seal portion 121 has an excellent sealing function.

When the end portion of the window glass 92, comes into contact with the glass contacting portion 125, the glass contacting portion 125 and the hollow portion 1250 are deformed. As a result, the end portion of the glass sealing lip 122 is brought into contact with the outer wall surface of the window glass 92, as shown in FIG. 1.

On the other hand, when the window glass 91 is lowered, the hoodmolding portion 123 provided at the end of the sliding seal portion 121 comes into sliding contact with the inner wall surface of the window glass 92. The hoodmolding portion 123 has a solid structure and it is firmly pressed against the inner wall surface of the window glass 92 by the projection 124. By this operation, the waterdrops which have adhered to the inner wall surface of the end portion of the window glass 92 are shed. That is, the hoodmolding portion 123 has a water shedding function.

Since the hoodmolding portion 123 is situated inside of the end portion of the glass sealing lip 122, as indicated by the arrow A in FIG. 1, it is invisible from outside behind the glass sealing lip 122. Thus, the seal structure 1 of this embodiment has an excellent external appearance.

The seal structure 1 of this embodiment is manufactured by integral insert extrusion using an extruder die in the shape of the cross section of the seal structure 1 and supplying the support strip 2 into the extruding head.

As described above, in this embodiment, since the seal structure obtained by integrating the door flange clamping portion 11, the glass seal portion 12 and the drip seal 13 is produced by integral extrusion, the manufacture is easy, the structure is simplified and the possibility of producing a gap between the elements at the time of assembly is precluded.

In addition, since the support strip 2 is integrally buried in the door flange clamping portion 11 and the back surface of the glass seal portion 12, the back surface of the glass seal portion 12 has a slight elasticity. The sealing function of the drip seal 13 is therefore enhanced and the structure of the door frame 91 on which the seal structure 1 is mounted is simplified.

While there has been described what is at present considered to be a preferred embodiment of the invention, it will be understood that various modifications may be made thereto, and it is intended that the appended claims cover all such modifications as fall within the true spirit and scope of the invention.

What is claimed as new and desired to be secured by letters patent of the United States is:

1. A seal structure for sealing windows of automobile doors which are raised to a closed position and lowered to an open position, comprising:
    a door flange clamping portion for mounting said seal structure on a door frame;
    a glass seal portion for stopping the gap between said door frame and a window glass when the window glass is raised to its closed position; and
    a drip seal;
    said door flange clamping portion, said glass seal portion and said drip seal portion being produced by integral extrusion;
    a support strip integrally buried in said door flange clamping portion and in a back surface of said glass seal portion;
    said glass seal portion including a sliding seal portion which comes into sliding contact with an inner wall surface of said window glass, and a glass sealing lip having a tip contacting an outside surface of said window glass when said window glass is in its closed position;
    said sliding seal portion being formed into a hollow shape except for a solid, enlarged, and bulbous hoodmolding portion provided at a free end thereof, said hollow shape comprising first and second flexible walls converging toward said hoodmolding portion from a third wall;
    wherein said glass seal portion is provided with a projection facing said hoodmolding portion so as to press said first and second flexible walls together between the inner wall surface of the window glass and said projection when the window glass is raised to its closed position, thereby greatly reducing the volume of said sliding seal portion in comparison with the volume of said sliding seal portion when said window is in its open position.

2. A seal structure according to claim 1, wherein said door flange clamping portion, said glass seal portion, said drip seal and said glass sealing lip are formed of an elastic material such as rubber and a plastic material by integral extrusion.

3. A seal structure according to claim 1, wherein said glass seal portion is provided with a glass contacting portion which is situated inside of the glass sealing lip and which is brought into contact with the end portion of the window glass and said glass contacting portion is provided with a hollow portion.

4. A seal structure according to claim 1, wherein said glass seal portion includes a door frame holding portion and said door frame holding portion is fixed to a fitting metal of the door frame.

* * * * *